United States Patent [19]
Tanaka et al.

[11] 3,752,285
[45] Aug. 14, 1973

[54] CENTRIFUGAL CLUTCH

[75] Inventors: Akio Tanaka, Neyagawa, Osaka Prefecture; Heiji Fukutake, Toyonaka, Osaka Prefecture; Kunihiko Ikeda, Neyagawa, Osaka Prefecture, all of Japan

[73] Assignee: Kabushiki Kaisha Daikin Seisakusho Kida-Motomiya, Neyagawa, Osaka Prefecture, Japan

[22] Filed: Aug. 19, 1971

[21] Appl. No.: 173,125

[30] Foreign Application Priority Data
Aug. 19, 1970 Japan..........................45/83038

[52] U.S. Cl..... 192/105 CD, 192/89 B, 192/103 B
[51] Int. Cl............................................... F16d 7/00
[58] Field of Search............... 192/105 CD, 105 BA, 192/103 B, 89 B

[56] References Cited
UNITED STATES PATENTS

| | | | |
|---|---|---|---|
| 2,370,199 | 2/1945 | Schukers | 192/105 BA |
| 2,888,121 | 5/1959 | Brueder | 192/105 CD |
| 647,733 | 4/1900 | Ward | 192/105 CD |
| 1,983,661 | 12/1934 | Frantz et al. | 192/105 CD |
| 2,513,798 | 7/1950 | Hatfield | 192/105 CD |
| 3,255,855 | 6/1966 | Peras | 192/105 BA |

FOREIGN PATENTS OR APPLICATIONS
932,089  7/1963  Great Britain ............... 192/105 CD

*Primary Examiner*—Charles J. Myhre
*Assistant Examiner*—Randall Heald
*Attorney*—Holman & Stern

[57] ABSTRACT

In a centrifugal clutch including straps each made of an arcuate plate spring and having one end secured to a mounting seat of a drive plate and the other end serving as a free end and clutch plates each fixed to the free end of each of the straps and having a clutch facing on the outer face thereof, damping springs being mounted on a suitable portion of the drive plate in resilient pressing contact with at least one of the opposite side faces of each of the clutch plates so as to produce sliding friction to effect a damping action when the clutch plates are moved radially. The clutch further includes means to guide the clutch plates in the radial movement.

1 Claim, 2 Drawing Figures

Fig.1
Fig.2
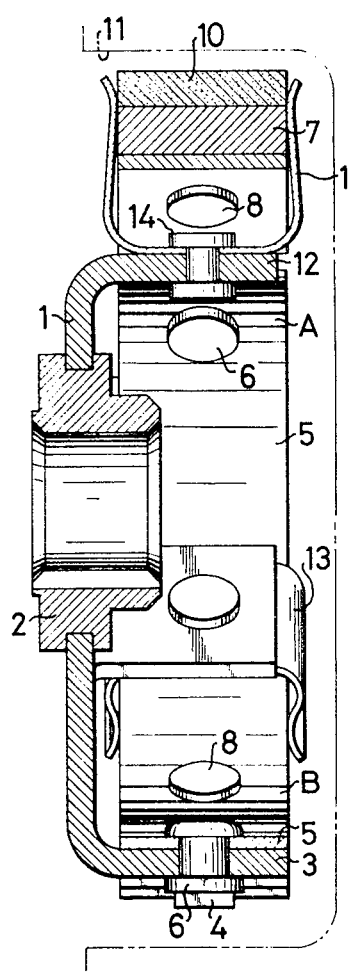
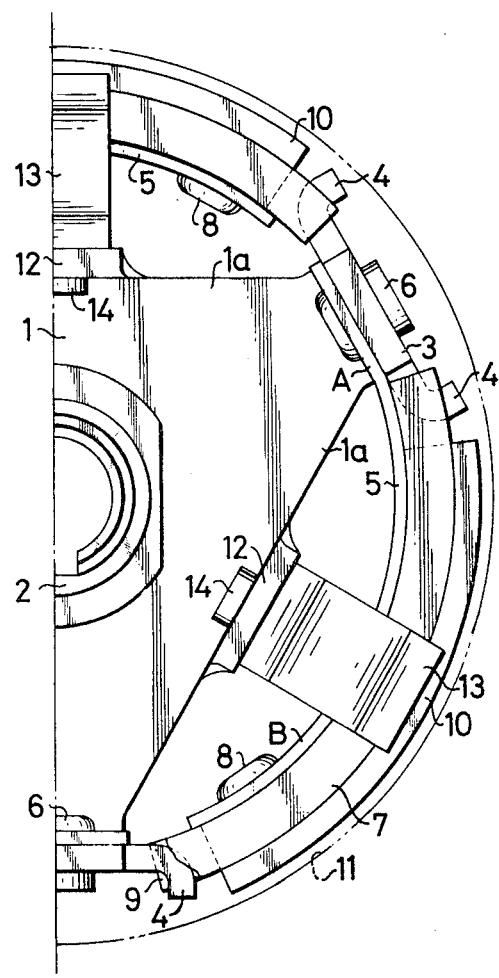

CENTRIFUGAL CLUTCH

BACKGROUND OF THE INVENTION

This invention relates to an improved centrifugal clutch.

A centrifugal clutch has already been known which comprises straps each made of an arcuate plate spring and having one end secured to a mounting seat of a drive plate and the other end serving as a free end and clutch plates fixed to the free ends of the straps respectively and having clutch facings on the outer faces thereof. When the straps are subjected to the action of centrifugal force due to the rotation of a drive unit including the drive plate, the free ends of the straps are displaced outward to bring the clutch facings into pressing contact with the inner surface of drum of a driven unit. Thus, the torque of the drive unit is transmitted to the driven unit when the rotational speed of the drive unit reaches a predetermined level. With the centrifugal clutch of this type, however, the straps are subjected to a centrifugal force due to the rotation of the drive unit to permit the free ends thereof to start moving outward in radial directions even before the rotational speed of the drive unit reaches a predetermined level at which the transmission of torque to the driven unit is attained. As a result, before the clutch becomes completely engaged by the full pressing contact of the clutch facings with the inner face of the drum on the driven unit under the action of centrifugal force, the natural frequency of oscillation of the straps and the vibration caused by repeated sticking and slippage between the clutch facings and the drum give rise to resonance and produce noises.

Further the heat generation caused by the friction between the clutch facings and the drum changes the resilient properties of the straps and impairs the normal torque transmitting performance of the clutch. Since the clutch facings in the above-mentioned centrifugal clutch of the prior art are brought into pressing contact with the drum inner surface even before the drive unit is driven at a speed sufficient for torque transmission, great friction takes place with substantial heat generation to result in a marked change in the properties of the straps and pronounced wear on the clutch facings.

OBJECTS AND SUMMARY OF THE INVENTION

An object of this invention is to provide a centrifugal clutch of the foregoing type which is free of noises due to the resonance of the natural frequency of oscillation of the aforementioned straps and the vibration resulting from repeated sticking and slippage between the clutch facings and the drum which resonance is to be produced before the clutch becomes fully engaged. According to this invention, such resonance is prevented by varying the resonance point through a damping action effected by the sliding friction between spring members and the clutch plates. More specifically, until the rotational speed of the drive unit reaches a speed sufficient to achieve the transmission of torque, the clutch plates are prevented from radial displacement to thereby preclude the sliding contact of the clutch plates with the drum on the driven unit. The contact of the spring members with the clutch plates further facilitates escape of the frictional heat and enables the straps to retain the original appropriate resilient properties for a prolonged period of time.

The present invention is primarily characterized in that in a centrifugal clutch of the foregoing type spring members are each mounted on a drive plate on the drive unit in resilient contact with at least one of the opposite side faces of each clutch plate. The invention is further characterized in that the spring member is U-shaped to effect resilient clamping contact with the opposite side faces of the clutch plate and that there is provided means for guiding the clutch plates when they are moved in radial directions.

In accordance with this invention, the sliding friction between the clutch plates mounted on the straps and the spring members due to the resilient contact therebetween produces a damping effect on the movement of the straps caused by the rotation of the drive unit and thereby varies the point of resonance between the natural frequency of oscillation of the straps and the vibration produced by the repeated sticking and slippage between the clutch facings and the drum to preclude resonance and the resultant noises. Furthermore, the resilient contact of the spring members with the clutch plates satisfactorily prevents incomplete pressing contact of the clutch facings with the inner surface of the driven drum resulting from the radially outward movement of the straps which takes place before torque transmission is effected. This substantially mitigates the wear on the clutch facings and heat generation due to friction. The spring members greatly promote release of heat from the overall assembly including the clutch plates, straps and the like and prevents deterioration of the resilient properties of the straps to be otherwise caused by the heat generated by friction, permitting the straps to retain the original appropriate resiliency over a prolonged period to ensure proper performance of the clutch.

The means provided for guiding the clutch plates in their radial movement assure that the spring members will achieve the foregoing effects insofar as they are each in contact with at least one side face of the clutch plate.

BRIEF DESCRIPTION OF THE DRAWING

FIG. 1 is a fragmentary view in section showing a preferred embodiment of this invention; and FIG. 2 is a front view showing half of the embodiment shown in FIG. 1.

DESCRIPTION OF THE PREFERRED EMBODIMENT

Referring to the drawing showing an embodiment of this invention, a drive plate 1 carries a drive boss 2 to be fixed to a shaft (not illustrated) driven by a motor such as an engine or the like. As shown in FIG. 2, the drive plate 1 is substantially triangular and the respective angle portions are bent to one side at a right angle to provide strap mounting seats 3. Angled members 4 extend from the ends of each mounting seat 3 which are opposite circumferentially of the drive plate. Each of straps 5 made of an arcuate plate spring is secured at its one end A to the mounting seat 3 with a rivet 6 or the like. The other end is a free end B.

An arcuate clutch plate 7 is disposed on the outer face of the strap 5 and fixed to the free end B with a rivet or the like 8. Formed in the circumferentially opposite ends of the clutch plate 7 are cutout grooves 9, in which the angled members 4 of the drive plates 1 engage. The clutch plate 7 is therefore movable in a radial direction by being guided by the angled members 4. Secured to the outer peripheral surface of the clutch plate 7 is a clutch facing 10 which is spaced apart by an appropriate distance from the inner face of a clutch drum 11 on a driven unit when the clutch is disengaged and is pressed against the inner face of the clutch drum 11 under the action of centrifugal force when the clutch is engaged.

The foregoing is the construction of one of centrifugal clutches already known. In accordance with this invention, each side 1a of the drive plate 1 of the centrifugal clutch of the type described is formed midway thereof with a bent portion 12 to which a U-shaped damping spring 13 is secured by a rivet 14 or the like. The damping spring 13 resiliently clamps the clutch plate 7 on the opposite sides thereof. With this arrangement, the sliding friction between the clutch plate 7 and the damping spring 13 produces a damping action when the clutch plate 7 is moved in the radial direction of the clutch under the action of centrifugal force.

Before the rotational speed of the drive plate 1 reaches a predetermined level, the assembly of the straps 5, clutch plates 7, clutch facings 10 and the like, even if subjected to a centrifugal force, are prevented from radially outward displacement by the resiliency of the straps 5 and the resilient clamping pressure exerted by the damping springs 13 which act against the centrifugal force, so that the clutch remains disengaged. When the rotational speed of the drive plate 1 reaches the predetermined level, the centrifugal force acting on the foregoing assembly overcomes the resiliency of the straps 5 and the clamping pressure, with the result that the straps 5 undergo plastic deformation to engage the clutch.

During the radial movement of the assembly acted on by the centrifugal force, the sliding friction produced between the clutch plates 7 and the U-shaped damping springs 13 effects a damping action, making it sure to vary the point of resonance between the natural frequency of oscillation of the straps and the vibration due to repeated sticking and slippage so as to preclude noises to be produced by the resonance.

The clamping force of the clutch can be controlled with extreme ease by varying the resiliency of the springs which clamp the clutch plates.

What is claimed is:

1. A centrifugal clutch comprising a triangular drive plate, a drive boss to which the drive plate is secured, said drive plate having mounting seats provided on its angle portions coaxially with the axis of rotation of the drive plate and also having bent portions provided midway of each side of the drive plate, arcuate straps having an outer face and opposite ends, the straps being secured at one end to the mounting seats and being free at the opposite end, arcuate clutch plates having opposite ends, disposed on the outer face of the straps and fixed to the free opposite ends of the straps, angled members provided on opposite sides of the mounting seats for engaging with the opposite ends of the arcuate clutch plates, said clutch plates being provided with cut out grooves at their opposite ends engaging with the angled members, clutch facings secured to the outer face of the clutch plates for facing the inner face of a clutch drum at an appropriate distance, and U-shaped damping springs secured to the bent portions of the drive plate resiliently clamping the clutch plates on opposite sides midway of the opposite ends thereof.

* * * * *